J. S. BUSKY.
SHOE SHANK.
APPLICATION FILED DEC. 18, 1905.

966,794.

Patented Aug. 9, 1910.
2 SHEETS—SHEET 1.

Witnesses
Max B. A. Doring.
O. H. Hopwood

John S. Busky, Inventor,
By his Attorney, Robt B Killgore

THE NORRIS PETERS CO., WASHINGTON, D. C.

J. S. BUSKY.
SHOE SHANK.
APPLICATION FILED DEC. 18, 1905.
966,794.
Patented Aug. 9, 1910.
2 SHEETS—SHEET 2.
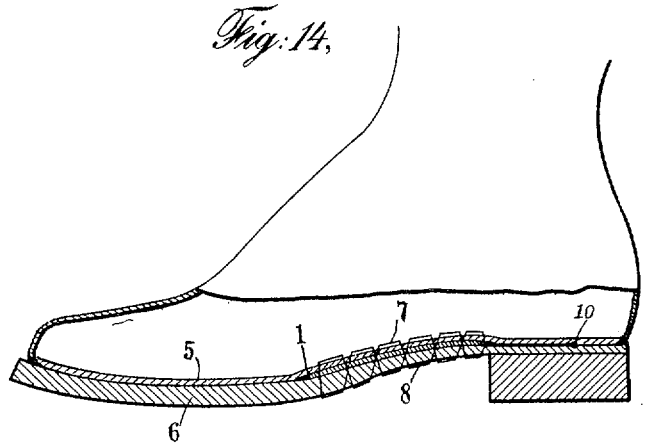
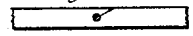
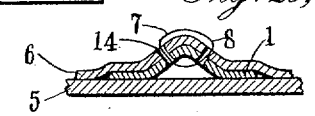
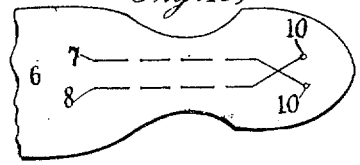
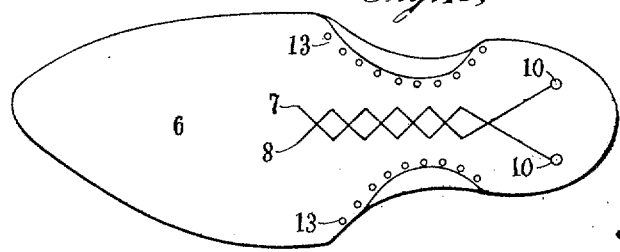
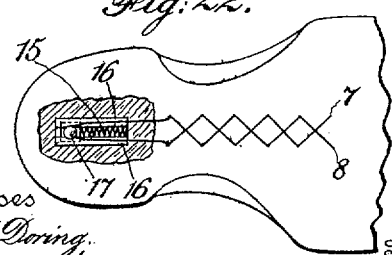
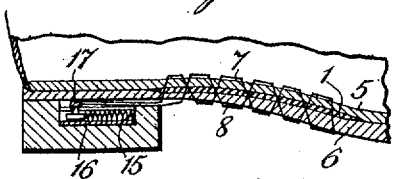
John S. Busky, Inventor,
By his Attorney, Robt B Killgore.
Witnesses
Max B A Doring.
O H Hopwood
THE NORRIS PETERS CO., WASHINGTON, D. C.

UNITED STATES PATENT OFFICE.

JOHN S. BUSKY, OF NEW YORK, N. Y.

SHOE-SHANK.

966,794.  Specification of Letters Patent.  Patented Aug. 9, 1910.

Application filed December 18, 1905. Serial No. 292,238.

*To all whom it may concern:*

Be it known that I, JOHN S. BUSKY, a citizen of the United States, residing in the borough of Brooklyn, county of Kings, city and State of New York, have invented certain new and useful Improvements in Shoe-Shanks, of which the following is a specification.

My invention relates to improvements in shoe shanks which are adapted to support the arch of the foot of the wearer and the objects of my invention are to provide a shank which will be small in size, light in weight and which will afford a flexible, but firm, support to the arch of the foot, which support will be greatest when the weight of the body is placed on the foot but which will be relieved when the weight is removed. I attain these objects in the manner illustrated in the accompanying drawings in which—

Figure 1:
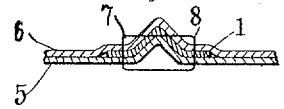
Figure 2:
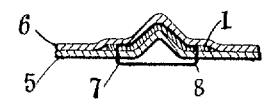
Figure 12:
Figure 13:

Figure 1 is a sectional, diagrammatic view of my improved shank secured to both inner and outer sole; Fig. 2 is a like view of the shank secured to the inner sole; Figs. 3 to 11 inclusive show the shank stiffener and modifications thereof; Figs. 12 and 13 show one form of anchorage for the reinforcing lacing; Fig. 14 is a diagrammatic sectional view of a shoe showing the shank construction; Fig. 15 is a view of the bottom of a shoe in which the lacing passes through the outer sole; Figs. 16 and 17 are views indicating how the reinforcing lacing may be embedded in channels cut in the sole of the shoe; Fig. 18 is a sectional view showing eyelets through which the reinforcing lacing is passed; Fig. 19 is a plan view of a shoe with the lacing extending in straight lines to reinforce the shank; Fig. 20 is a diagrammatic, sectional view of the shank secured to the outer sole; and Figs. 21 and 22 are views of the slidable anchorage in the shoe.

Figure 3:
Figure 4:
Figure 5:
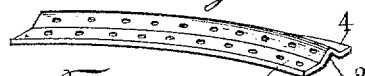
Figure 6:
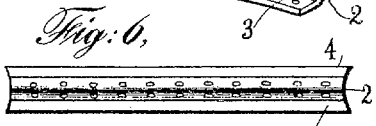
Figure 7:
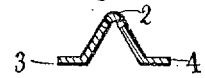
Figure 8:
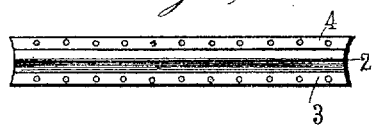
Figure 9:
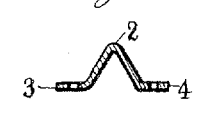
Figure 10:
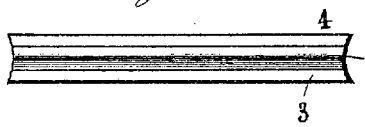
Figure 11:
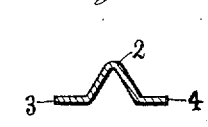

The shank stiffener is preferably made with a V-shaped section as shown in Figs. 4, 7, 9 and 11 and is curved lengthwise as shown in Fig. 5, but may be of any other desired form. Any suitable material or combination of materials such as leather, metal, composition or wood may be used in the shank stiffener. As shown, it consists of the V-part 2 with the webs 3 and 4 on either side thereof at the base. This shank stiffener may have perforations in the webs 3 and 4 and near the apex of the V-part 2 as shown in Figs. 3, 4, and 5 to receive the lacing, or the perforations may be placed in the V-part only as shown in Figs. 6 and 7 or in the webs 3 and 4 as shown in Figs. 8 and 9, or they may be entirely omitted as shown in Figs. 10 and 11.

The shoe generally contains the inner sole 5 and the outer sole 6. In making up a shoe embodying my improved construction the shank stiffener 1 is placed on the inner sole 5 under the arch as shown in Fig. 2, the outer sole, having a ridge formed in it to receive the V-part 2 of the shank, being placed on top. A lacing of wire, wax ends, twine or other like material 7 and 8 is then laced or sewed from the front end of the shank to the rear or heel part of the shoe through both inner and outer sole as shown in Fig. 1, the lacing being crossed as shown most clearly in Fig. 15. The ends of the lacing 7 and 8 are secured to the studs 10, 10 in the heel part of the shoe. This anchorage may be solid as shown in Fig. 15 or it may be slidable as shown in Figs. 12 and 13 the former of which is a grooved piece 16 to be set in the heel part and receive the anchorage stud 17 to the latter of which the lacing is secured. A helical spring 15 maintains a rearward pressure on the stud and maintains the tension of the lacing. The stud is therefore free to move backward and forward in the groove and allow the shank to yield more freely under the movement of the foot. Instead of the lacing 7 and 8 passing through both soles it may be used to secure the shank stiffener to the inner sole as shown in Fig. 2 or to the outer sole as shown in Fig. 20. If the shank stiffener is secured to the inner sole as shown in Fig. 2 the outer sole completely covers and protects the lacing. If however the lacing passes through the outer sole as shown in Figs. 1, 14, 15 and 20 it will be exposed and in this case a wire of suitably covered material should be used so that the lacing will resist corrosion, or a channel may be cut in the sole and the lacing laid in it after which the channel may be sealed up as shown in Figs. 16 and 17. A cement may be laid in the channel to receive the lacing as a still further protection. To still further strengthen the support the shank portion of the soles may be secured together by a series of rivets or screws 13 near the edge.

By selecting a properly pierced shank stiffener from those shown, shoes embodying my improvement may be made on sewing machines which work either vertically or horizontally. If the lacing 7 and 8 cuts the leather of the sole the holes through which it passes may be lined with the collars or eyelets 14 as shown in Figs. 18 and 20. If desired the lacing may be run through in a straight line as shown in Fig. 19 instead of being crossed. I prefer the crossed form however as it forms in effect a trussed arch.

With my improvement a very narrow shank is used but the greatest strength is obtained by reinforcing with lacing and by combining the shank, sole and lacing into a single structure still greater strength is obtained. The pressure on the arch is firm and solid but at the same time flexible and in this respect differs from the stiff plates generally employed.

I claim:—

1. A shoe shank comprising a sole; a shank stiffener secured thereto; a lacing engaging the stiffener and uniting it to the sole and extending from the forward end of the shank to the heel portion of the shoe; and anchorages at the heel part of the shoe to which the lacing is secured.

2. A shoe shank comprising a sole; a shank stiffener secured thereto; reinforcing lacing uniting the sole and shank stiffener and extending from the forward end of the shank to the heel portion of the shoe; and a slidable anchorage to which the lacing is secured.

3. A shoe shank comprising a sole; a shank stiffener of substantially V-section provided with webs on either side thereof secured to the sole; and a reinforcing lacing uniting the sole and shank stiffener and extending from the forward end of the shank to the heel portion of the shoe.

4. A shoe shank comprising a sole; a perforated shank stiffener of substantially V-shaped section provided with webs on either side thereof; and a reinforcing lacing uniting the sole and shank stiffener and extending from the forward end of the shank to the heel portion of the shoe through the perforations and sole.

5. A shoe shank comprising a sole, a shank stiffener of substantially V-shaped section having webs on either side thereof secured to the sole, anchorages in the heel part; and a reinforcing lacing engaging the shank stiffener and extending from the forward end of the shank to the heel portion of the shoe and secured to the anchorages whereby the stiffener and sole are united.

6. A shoe shank comprising a sole; a shank stiffener of substantially V-shaped section having webs on either side thereof secured to the sole; a grooved plate in the heel part of the sole; a stud slidably secured to said plate; and a reinforcing lacing uniting the shank stiffener and sole and extending from the forward end of the shank to the heel portion of the shoe, the ends of said lacing being secured to the stud.

7. A shoe shank comprising a sole; a shank stiffener secured thereto; eyelets in the sole and a lacing engaging the shank stiffener and uniting the stiffener and sole extending from the forward end of the shank to the heel portion of the shoe and passing through said eyelets for the purpose set forth.

In testimony whereof I have affixed my signature in the presence of two witnesses.

JOHN S. BUSKY.

Witnesses:
 ROBT. B. KILLGORE,
 O. H. HOPWOOD.